July 3, 1928.

D. A. JOHNSON

GRUBBING MACHINE

Filed March 29, 1927

INVENTOR.
David A. Johnson.
BY U. G. Charles
ATTORNEY.

July 3, 1928.

D. A. JOHNSON

GRUBBING MACHINE

Filed March 29, 1927

INVENTOR.
David A. Johnson.
BY
U. G. Charles
ATTORNEY.

July 3, 1928.
D. A. JOHNSON
GRUBBING MACHINE
Filed March 29, 1927
1,675,413
3 Sheets-Sheet 3
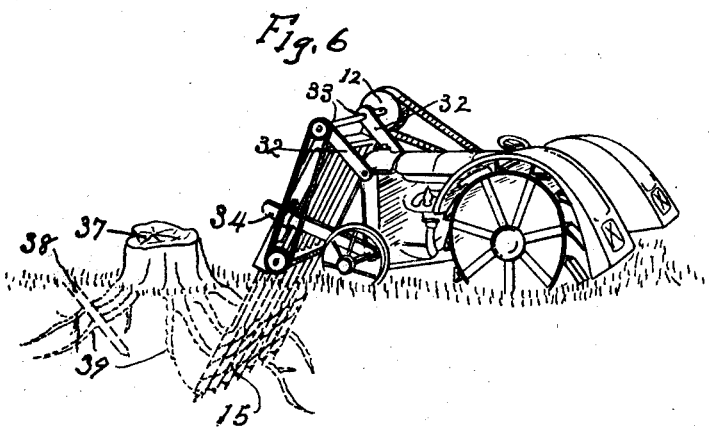
INVENTOR.
David A. Johnson
BY
U. Y. Charles
ATTORNEY.

Patented July 3, 1928.

1,675,413

UNITED STATES PATENT OFFICE.

DAVID A. JOHNSON, OF BELVUE, KANSAS.

GRUBBING MACHINE.

Application filed March 29, 1927. Serial No. 179,383.

My invention relates to a grubbing machine for trees or the like.

The object of my invention is to provide a machine for severing the roots of a tree disconnecting it from the earth.

A further object of my invention is to provide a machine that will function regardless of frozen ground or other conditions.

A still further object of my invention is to provide a portable machine that is easily positioned about the trunk of a tree as severing means for the roots.

A still further object of my invention is to provide a machine for grubbing trees or the like eliminating the necessity of removing the earth as is commonly practiced heretofore.

A still further object of my invention is to provide a machine having a plurality of severing members positioned in close proximity to engage with the varying sized roots, and whether the roots be severed entirely or not they will be weakened sufficient for the tree to fall whereby the stump may be removed.

These and other objects will hereinafter be more fully explained.

Referring to the drawings:

Fig. 6 is a perspective view of the machine in operation.

Figure 1:
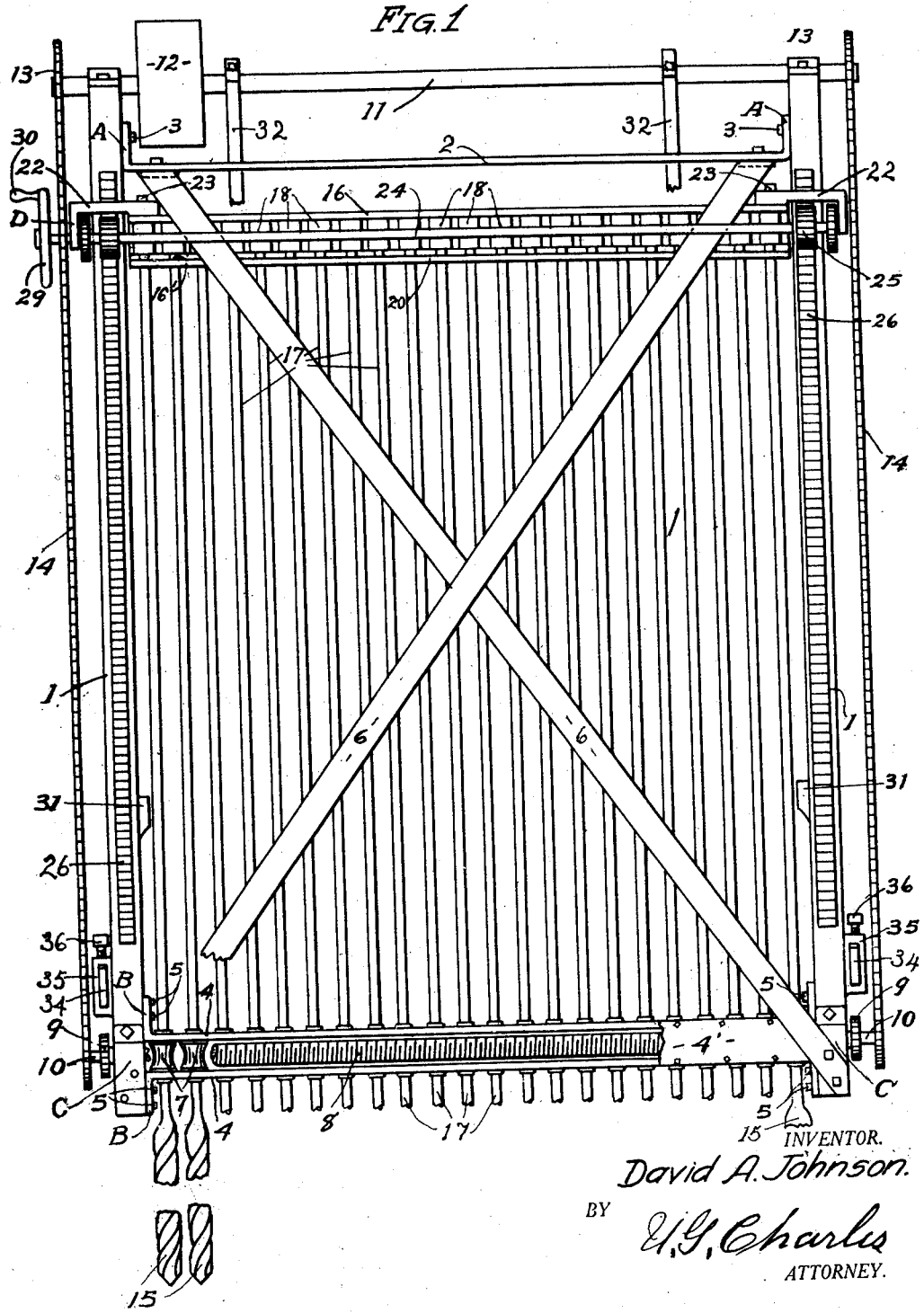
Fig. 1 is a plan view of the drill bit supporting means.

The grubbing machine herein disclosed consists of a frame comprising two side bars 1 connected at their upper ends by a tie bar 2 the ends of which are bent to a right angle as at A to engage snugly with the inside of the bars and are attached firmly by means of cap screws 3. The opposite or lower ends of the said side bars are connected by a housing consisting of two bars 4 having a right angle bend B at both ends thereof and firmly attached to the inside of the said bars by means of cap screws 5.

As a bracing means for the frame, I have provided two diagonally positioned bars 6 the ends of which are rigidly attached to the corners of the frame. Positioned between the bars 4 and trunnioned therein are a plurality of worm gears 7, the said gears being rotated by worms 8 positioned on opposite sides thereto and in mesh therewith. The said worms are trunnioned to the lower end of the side bars 1 as at C. The worms are geared together at both ends by gears 9 which are rigidly attached to their respective spindles 10, said spindles being integral with the worms. As an inclosing means for the worm and worm gears I have provided a plate 4' attached to both sides of bars 4 by means of cap screws rendering it oil tight, the worm and gears being packed in hard oil.

Trunnioned on the upper ends of the side bars 1 is a shaft 11 to which is attached a driving pulley 12, said pulley to receive a belt from the drive pulley of a tractor or other motive power as shown in Fig. 6.

Sprockets 13 are rigidly attached to both ends of said shaft as actuating means for the worms through the medium of chains 14 by which means the plurality of bits 15 are caused to rotate, functioning as hereinafter described.

It will be understood that the two chains 14 engage the sprockets on separate worms, and the two worms being geared together as heretofore described the power is equally applied to both ends thereof. Laterally and movably positioned between the side bars 1 is a conveying member 16, the said member being a channel and having a plurality of laterally extending slots 16' in one side thereof equally distributed longitudinally to receive the shafts 17 which are integrally connected to the drill bits 15, the said shafts rotatably engaging therein. As a retaining and carrying means for the shafts when the conveying member reciprocates, I have provided and attached rigidly on the ends thereof a sleeve member 18, the said member being fastened by means of a set screw, the threaded aperture for which is shown at 19, the said sleeve rotatably engaging between the walls of the channelled conveying member.

Figure 2:
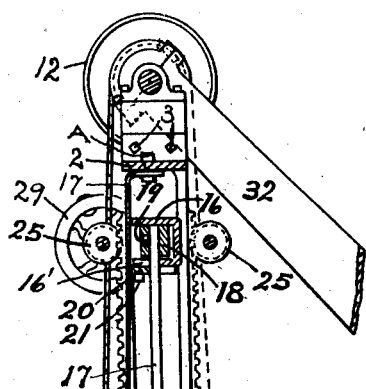
Fig. 2 is a transverse view of Fig. 1.

As a means to retain the shafts in operative position within the channelled conveying member I have provided a member 20 having similar slots to those in the side of the conveying member to engage with the said shafts in reversed position. The said member is rigidly attached by means of cap screws 21 as shown in Fig. 2.

As a means to convey the beam from one end of the frame to the other carrying with it the bits, I have provided a bifurcated block 22 having a right angle bend as at D on the outer ends thereof functioning as bearings for a train of gears hereinafter described.

Figure 5:
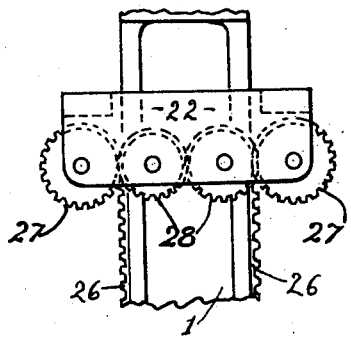
Fig. 5 is an enlarged fragmentary side view of the rack and gear actuating means for the travel of the drill.
Figure 4:
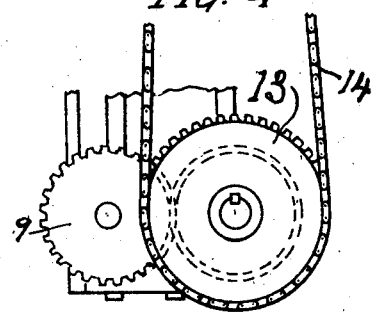
Fig. 4 is an enlarged end view of the drill bit driving means.

The bifurcation of the block receives the side bars 1 and extends over for rigid engagement with the ends of the beam to which it is attached by means of cap screws 23. Rotatably positioned on both sides of the beam and trunnioned in the block are two shafts 24 having gears 25 to engage with a rack 26. The said gears are connected for simultaneous rotation by a train of gears as shown in Fig. 5; the gears 27 are attached to the ends of the shafts and intermediately positioned are two gears 28, by which means the rack gears 25 will rotate in opposite directions to uniformly convey the beam to and fro in the frame.

Figure 3:
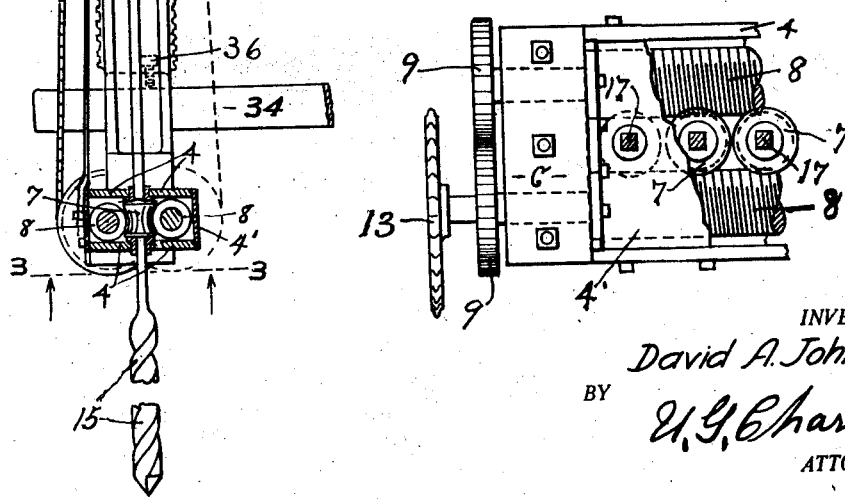
Fig. 3 is an enlarged fragmentary end view taken along line 3—3 in Fig. 2, parts removed for convenience of illustration.

On one end of one of the rods 24 I have placed a hand wheel 29 having a handle 30 positioned thereon, by which means the beam is conveyed manually. Spaced from the lower end and rigidly attached to the side bars 1 are stop blocks 31, the object of which is to space apart the two bearing points for the shafts of the bits. It will be understood that the said bit shafts are square as shown in Fig. 3, as a means for sliding engagement through the worm gears 7 while said gears are rotating the bits.

By the rack mode of operation when the machine is properly positioned, the bits may be drawn upward or downward simultaneously while the worms are in action revolving the bits, or during the period of idleness.

In Fig. 6 is shown a tractor to which the grubbing machine is pivotally connected by arms 32 that are rigidly connected to the tractor, the machine pivotally engaging in the outer ends as at 33. As a means to rock the frame to different angles I have provided a pair of bars 34 pivotally connected to the tractor and positioned to engage with both sides of the frame as shown in Fig. 1. The said bars slidably engage in the slot of a member 35 the said member being rigidly attached to the side bars 1. When the frame is rocked to a desired angle it is attached by means of set screws 36 which threadedly engage in the top of the slotted member and adapted to bind on the upper edge of the bars.

In Fig. 6 is shown a stump of a tree 37 having roots extending therefrom, and on one side is a slot 38 which is cut by the series of bits in their downward movement toward the vertical axis of the stump, the object of which is to sever the roots as shown at 39. The process of boring may continue around the stump or tree until all roots have been severed, at which time the stump or tree may be removed.

Such modifications may be employed as lie within the scope of the appended claims.

Having thus described my invention, what I claim as new and desire to secure by Letters Patent is:—

1. In a grubbing machine, in combination with a power actuating means, a frame having a shaft rotatably mounted on the upper end thereof, arms extending from the power actuating means in which the shaft is rotatably mounted and on which the frame will swing, pivotally connected bars on the power actuating means, a clamping means on the lower end of the frame to engage along said bars whereby the desired angle of the frame is fixed, a beam positioned between the sides of the frame, a toothed rack on the rear and front of both side members of the frame, a pair of gears trunnioned on both ends of the beam to engage with the said toothed racks, a train of gears connecting the first said gears as equalizing means for the rotation of the first said gears to cause a reciprocating travel of the beam, manual means to rotate the gears, a plurality of drill bits positioned in close working relation and equally spaced across the frame, the upper ends thereof rotatably engaging in the beam and thrust longitudinally thereby, the shafts of the bits being square, worm gears trunnioned on the lower end of the frame, a square aperture axially extending through the gear to slidably engage the shaft as rotating means for the bits while sliding longitudinally therethrough, worms trunnioned to engage on both sides of the gears for simultaneous rotation thereof, means to rotate the worms, all substantially as shown.

2. In a grubbing machine, a frame comprising two side bars with toothed racks on the front and back of each thereof, a worm and worm gear housing to connect said bars at one end, a bar member to connect the opposite ends so that the side bars are parallel, diagonal bracing for the frame, a beam carried by gears engaging on said racks, means to rotate the gears for an upward and downward movement of the bar, a plurality of drill bits having stems of considerable length and equally distributed between the side bars, the stems being square sectionally, the upper ends thereof trunnioned in the beam in such a way that the said stems are thrust outward and retracted thereby, a worm gear for each of the stems trunnioned in the housing, a square aperture axially positioned in the gear to receive the stems slidably engaging therein and functioning as rotatable means therefor, a worm threadedly engaging on opposite sides of the worm gears as motive power for the rotation thereof simultaneously, a gear on both ends of each of the worms to engage as rotary equalizing means therefor, a driving means on one end of each of the worms, and a power actuating means for the mechanism, all as, and for the purpose described.

In testimony whereof I affix my signature.

DAVID A. JOHNSON.